United States Patent Office 2,725,633
Patented Dec. 6, 1955

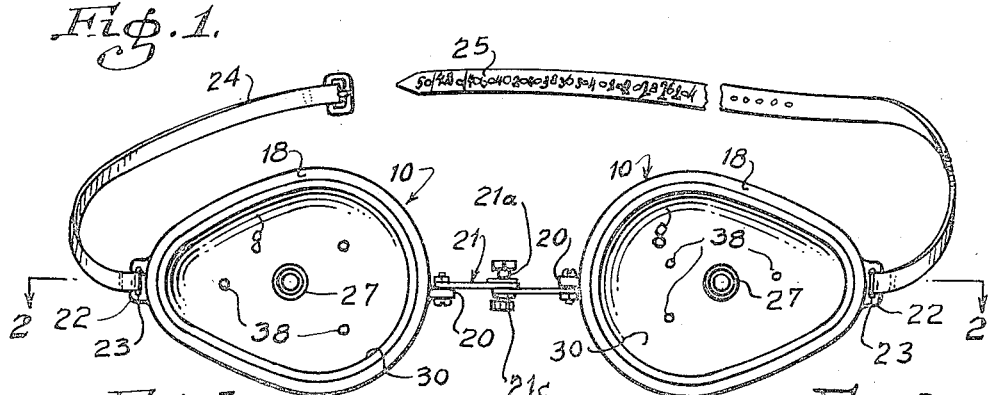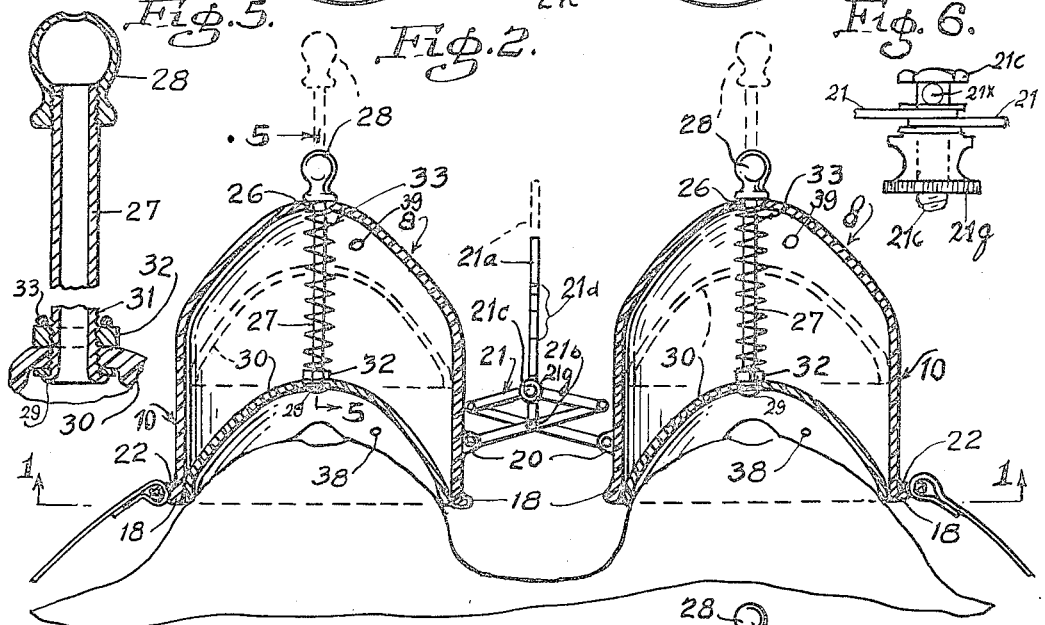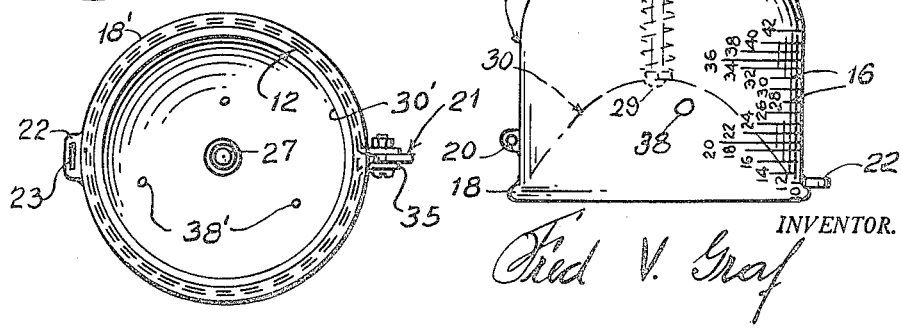

2,725,633

SANITARY BUST MEASURING DEVICE

Fred V. Graf, Los Angeles, Calif.

Application August 10, 1953, Serial No. 373,212

3 Claims. (Cl. 33—2)

This invention relates to a sanitary bust measuring device and is an improvement upon my Patent No. 2,559,501, issued July 3, 1951.

An object of this invention, from a sanitary viewpoint, is to provide a bust measuring device which eliminates the necessity of fitting a customer with several brassieres which are eventually returned to stock and fitted on other customers. It is more particularly an object of this invention to provide such a device which is adapted to be used by a woman to take her own measurement.

It is a further object of my invention to provide such a device in which the size of each breast is separately determined in liquid ounces, by means of graduated markings on a pair of transparent cylindrical members which are placed over the breasts. My device is particularly beneficial in duplicating correctly the breast of an amputee. It is a further object of this invention to provide round or ovoidal transparent members in various sizes to conform to the size and shape of the breasts.

Another object of my invention is to provide means for simultaneously measuring the separation of the breasts and the body size.

In essence, my invention contemplates a device of the class described comprising a pair of hollow cylindrical members in which are slidably mounted a pair of hollow spring biased plungers. The cylindrical members have open ends which fit against the body, while the plungers receive the breasts and move within the cylinder members in proportion to the size of the breasts. The cylinder members carry graduations to indicate the amount of displacement of the plungers. The cylinder members are attached at their inner sides by a pair of lazy tongs which carry means for measuring the separation of the breasts. The outer sides of the cylinder members carry a pair of straps which are fastened together around the body and which carry means for measuring the body size.

My invention also comprises such other objects, advantages, and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is an isometric view showing the inside of my device;

Fig. 2 is a sectional view taken on line 2—2 of Fig. 1, with movement of the parts indicated in dotted lines;

Fig. 3 is an elevational view of the right hand portion of Figs. 1 and 2.

Fig. 4 is a bottom view of a modified form of my cylindrical member and plunger;

Fig. 5 is a sectional view taken on line 5—5 of Fig. 2.

A preferred embodiment which has been selected to illustrate my invention comprises a pair of hollow transparent ovoidal cylinder members 10. The bases of the cylinder members 10 are flared out adjacent their open ends 18 to fit against the body. The cylinder members 10 are connected by a pair of adjustable lazy tongs 21, which extend therebetween and which are attached to inwardly directed lugs 20.

The outer sides of cylinder members 10 are provided with outwardly directed lugs 22, to which are connected a pair of elongated straps 24 and 25. Strap 24 carries a buckle at its opposite end, while strap 25 has a series of openings with numerical designations beside them to designate the body size when my device is worn and the straps 24 and 25 are fastened together.

The cylinders 10 are provided with closed end portions 8, which have air vents 39 extending therethrough. Each of the end portions 8 has a centrally disposed opening 26, through which an elongated tube 27 slidably extends. A knob 28 is screw threadedly mounted on the outer end of each of the tubes 27. The opposite ends of the tubes 27 are screw threadedly attached to a pair of nuts 32 and then extend through centrally disposed openings in the outer ends of a pair of hollow plungers 30. The ends of tubes 27 have flared portions 29 disposed within the plungers 30 on the opposite side thereof from nuts 32.

The plungers 30 are ovoidal in shape and are slidably mounted within the cylinder members 10. A pair of coil springs 33 surround tubes 27, bearing against the inside of the end portions 8 and against the nut 32. Coil springs 33 thus tend to urge plungers 30 toward the open ends 18 of cylinder members 10. The plungers 30 are provided with a plurality of air openings 38, which extend therethrough.

In use, my device is used in a manner similar to that of fitting a brassiere. The user bends over and places the breasts within the open ends of the plungers 30. The breasts push the plungers 30 within cylider members 10 toward their closed end portions 8. This movement is resisted by the coil springs 33, which keep the plungers 30 in firm contact with the breasts.

The cylinder members 10 are provided with a plurality of numerically designated graduations 16, which designate the breast size in proportion to the movement of the plungers 30 with respect to cylinder members 10. The graduations 16 preferably designate liquid ounces.

The lazy tongs 21 are adjusted by means of a control knob 21c to determine the separation of the breasts. The straps 24 and 25 extend around the bottom and are fastened together adjacent the back to determine the body size of the wearer.

In Fig. 4 of the drawings, I show a modified form of cylinder member 12, which is more rounded for measuring rounder and more youthful breasts.

I claim:

1. A sanitary bust measuring device comprising a pair of hollow cylinder members, each of said cylinder members having an open end adapted to fit against the body around the breasts, a spring biased hollow plunger slidably mounted within each of said cylinder members, said spring biasing normally urging said plungers toward the open end of said cylinder members, each of said plungers having an open end normally disposed adjacent the open end of one of said cylinder members and a closed end disposed within said cylinder member, each of said plungers adapted to receive a breast and to move within said cylinder member away from the open end thereof in proportion to the size of the breast, said cylinder member being stationary with respect to the body, each of said cylinder members having graduations marked thereon to indicate the size of the breast by measuring the amount of movement of said plungers with respect to said cylinder members.

2. The subject matter of claim 1 and a pair of lazy tongs connected between said cylinder members, said lazy tongs having means to indicate the separation of said cylinder members for measuring the separation of the breasts.

3. The subject matter of claim 1, the inner sides of said cylinder members being connected to each other, and a pair of straps connected to the outer sides of said cylinder members, at least one of said straps having means thereon indicating the size of the body of the wearer when said straps are fastened together therearound.

References Cited in the file of this patent

UNITED STATES PATENTS 2,559,501    Graf _____ July 3, 1951

FOREIGN PATENTS 767,227    France _____ May 1, 1934